United States Patent
Ishihara et al.

(10) Patent No.: US 6,937,009 B2
(45) Date of Patent: Aug. 30, 2005

(54) ROTATION SENSOR AND DISPLACEMENT DETECTING APPARATUS AND METHOD UTILIZING THE SAME

(75) Inventors: Takehisa Ishihara, Tokyo (JP); Tomotaka Watanabe, Tokyo (JP); Fumihiko Abe, Tokyo (JP); Dongzhi Jin, Tokyo (JP); Kengo Tanaka, Tokyo (JP)

(73) Assignee: The Furukawa Co., Ltd. (JP)

( * ) Notice: Subject to any disclaimer, the term of this patent is extended or adjusted under 35 U.S.C. 154(b) by 81 days.

(21) Appl. No.: 10/600,559

(22) Filed: Jun. 20, 2003

(65) Prior Publication Data

US 2004/0051521 A1 Mar. 18, 2004

(30) Foreign Application Priority Data

Jun. 24, 2002 (JP) ........................................ 2002-183074

(51) Int. Cl.$^7$ ................................................. G01B 7/30
(52) U.S. Cl. ................................................. 324/207.25
(58) Field of Search ................................ 324/244, 260, 324/207.11–207.17, 207.2, 207.21, 207.23, 207.25; 310/261; 384/448; 123/612, 617

(56) References Cited

U.S. PATENT DOCUMENTS

2002/0078764 A1 * 6/2002 Jin et al. ................ 73/862.331

FOREIGN PATENT DOCUMENTS

JP          11-329649          11/1999

* cited by examiner

*Primary Examiner*—Bot LeDynh
(74) *Attorney, Agent, or Firm*—Cantor Colburn LLP

(57) ABSTRACT

A rotation sensor comprising: a stator of the rotation sensor; a rotator arranged around the stator in a rotatable manner relative to the stator, so as to detect a rotated-angle variation of a detection target correspondingly to an overlapped state of the rotator with the stator; and a casing for accommodating the rotator therein; wherein at least a part of an outer peripheral surface of the rotator is slidable relative to an inner surface of the casing for accommodating the rotator and stator therein, so that the rotator is constantly smoothly rotated, to thereby accurately detect the rotated-angle variation of the measurement target.

18 Claims, 4 Drawing Sheets

ROTATION SENSOR AND DISPLACEMENT DETECTING APPARATUS AND METHOD UTILIZING THE SAME

BACKGROUND OF THE INVENTION

1. Field of the Invention

The present invention relates to a rotation sensor adapted to exemplarily detect a rotated angle of a measurement target and a linear displacement corresponding to the rotated angle, and to a displacement detecting apparatus and method utilizing the rotation sensor.

2. Description of the Prior Art

Conventionally, rotation sensors have been utilized to measure a slid amount of an in-vehicle target such as in an in-vehicle power window apparatus and electric power seat apparatus.

As shown in FIG. 1, such a conventional type of rotation sensor 5 comprises: a casing 51 having an opened upper portion; a cover 52 attached onto the opened portion; and a shaft 61 supported at a bottom portion of the casing 51 and at a center portion of the cover 52. The shaft 61 is coupled to a disk-like plate portion 62 within the casing, and this plate portion 62 has a peripheral portion provided with an electroconductive plate 64 of an electrically conductive nature over a certain region of the peripheral portion. Such shaft 61, plate portion 62 and electroconductive plate 64 cooperatively constitute a rotator 60 of the rotation sensor 5.

Meanwhile, arranged inside the rotator 60 is a stator 70. The stator 70 is fixed to the casing via printed board 53 and spacer 54. Further, the stator 70 is constituted of a coil core 73 and an electroconductive plate 74 affixed to a certain region of the circumference of the coil core 73, and the coil core 73 comprises a coil 71 and a bobbin 72. Namely, the electroconductive plate 74 of the stator and the electroconductive plate 64 of the rotator are opposed to each other, in a state for providing a certain gap therebetween. The area to be opposedly and overlappedly defined by the electroconductive plates of the stator 70 and rotator 60 is varied correspondingly to the rotation of the rotator 60.

Clamped between the plate portion 62 of the rotator and the cover 52 is an O-ring 55 which provides a seal such as for avoiding entrance of liquid exemplarily into the coil core 73 and electroconductive plates 64, 74 through the bearing portion for the shaft 61.

Coupled to the end of the shaft protruded from the cover 52 is a pulley 65 wound with a wire 66 made of metal. The wire 66 is pulled (see an arrow A in FIG. 1), correspondingly to a slid amount of a measurement target (not shown in FIG. 1) such as a seat coupled to the wire 66. The pulled wire 66 correspondingly rotates the pulley 65, thereby correspondingly varying that peripheral area of the coil core which is surrounded by both of the electroconductive plate 64 of the rotator and the electroconductive plate 74 of the stator.

Eddy currents to be caused within the electroconductive plates 64, 74 are varied due to the change of the area of the covering region defined by the electroconductive plate 64 of the rotator and the electroconductive plate 74 of the stator, and due to the magnetic flux to be generated by the coil core 73, so that the coil inductance is varied correspondingly to the variation of the eddy currents. Such a variation of the coil inductance is detected by a detecting circuit (not shown), to thereby detect a displacement of the measurement target, such as a slid amount of the seat.

Note, mounted between the pulley 65 and the cover 52 in FIG. 1 is an elastic body 67 for returning the pulley to its origin. Absent the pulling of the wire 66, the pulley 65 and the rotator 60 to be integrally rotated therewith are returned to their origins by virtue of the elastic force of the elastic body itself.

However, there is a gap between the shaft 61 and its bearing portion, in the above type of rotation sensor 5. This leads to an inclination of the shaft 61 as shown in FIG. 2 such as when the shaft 61 is acted by a bending moment from the wire 66 via pulley 65, thereby obstructing a smooth rotation of the rotator 60.

Explaining in detail in this respect, the conventional type of rotation sensor 5 bears the shaft 61 at the positions of the shaft ends in FIG. 2, and these portions of the shaft near the ends of the shaft act as sliding portions of the rotator 60, respectively.

To slide the rotator 60, there is required a certain clearance between the shaft 61 and the bearing portions of the casing. However, excessively large clearances cause the shaft 61 to be inclined relative to the casing 51 as shown in FIG. 2. This inclination leads to failure of parallelism between the sensing portion fixed to the shaft 61 and the coil core 73 (FIG. 1) fixed to the casing 51. This results in fluctuation of a distance between the sensing portion and the coil core 73, thereby fluctuating the output signal, and thereby deteriorating the reliability of the rotation sensor 5.

There is also a problem of interference of the rotation sensor 5 with other parts around it, upon installing the rotation sensor 5.

Concretely, there shall be considered a situation where the rotation sensor 5 is to detect a displacement of a measurement target. This situation provides the above-mentioned structure in which the O-ring 55 for providing the sensor portion with a waterproof function is arranged between the rotator 60 and the casing 51, and the wire 66 is wound around the pulley 65, while the other end of the wire 66 is coupled to the detection target. The displaced portion fixed to the wire as well as the wire itself are exposed to the exterior of the casing of the rotation sensor 5, and also the pulley 65 wound with such a wire 66 is exposed to the exterior of the casing of the rotation sensor 5. This requires to endeavor to keep the pulley 65 from interfering with other parts, such as upon mounting the rotation sensor 5 onto a vehicular body, thereby resulting in a troublesome operation. Although it is conceivable to adopt a structure for additionally providing a specific protection wall outside the pulley 65 to thereby avoid the aforementioned interference with other parts, this leads to an increased number of parts and an increased cost.

Further, when the rotation sensor 5 is utilized to exemplarily detect a seat slid amount of a vehicle, there is caused an additional problem that the rotator 60 is not smoothly rotated such as due to vibrations during running of the vehicle.

SUMMARY OF THE INVENTION

It is therefore an object of the present invention to provide a rotation sensor capable of solving all of the aforementioned problems and capable of allowing a rotator to constantly smoothly rotate, thereby accurately detecting a rotated-angle variation of a measurement target.

To achieve the above object, the rotation sensor recited in claim 1 includes: a stator; a rotator arranged around the stator in a rotatable manner relative to the stator, so as to detect a rotated-angle variation of a detection target correspondingly to an overlapped state of the rotator with the stator; and a casing for accommodating the rotator therein;

wherein at least a part of an outer peripheral surface of the rotator is slidable relative to an inner surface of the casing.

Unlike the conventional rotation sensor, the rotation sensor of the present invention never has such a constitution that the rotator arranged around the stator is rotatably supported within the casing by means of a shaft, but the rotation sensor of the present invention has such a constitution that at least a part of the outer peripheral surface of the rotator is slidable relative to the inner surface of the casing. This reduces the possible inclination of the rotator itself, thereby excluding obstruction of a smooth rotation of the rotator due to the inclination of the shaft.

This enables to accurately detect the rotated-angle variation of the detection target, thereby allowing to obtain a stabilized detection signal.

Preferably, in the rotation sensor of the present invention recited in Claim 1, the rotator is protrudedly formed with a shaft for rotating the rotator.

The detection target is coupled to the shaft, thereby enabling to accurately and readily detect the rotated-angle variation of the detection target.

Preferably, in the rotation sensor of the present invention recited in Claim 1, the rotator is formed with a pulley at a predetermined position of the rotator, and the rotator is rotatable by a wire which is wound around the pulley and which is drawn out to the exterior of the casing.

The detection target is coupled to the wire, thereby enabling to accurately detect the displacement when the detection target is linearly moved. Further, the pulley is formed on the rotator and accommodated within the casing, so that the rotation of the pulley is never obstructed by interference of the pulley with members arranged near the rotation sensor.

Preferably, in the rotation sensor of the present invention recited in anyone of Claims 1 through 3, the rotator is provided with an electroconductive plate of an electrically conductive nature; the stator is provided with an electroconductive plate and a coil core of an electrically conductive nature; and there is a seal member interposed between the casing and the rotator, so as to liquid-tightly seal the electroconductive plate of the stator, the electroconductive plate and the coil core of the rotator, from the exterior of the casing.

By virtue of the seal member, the rotated-angle variation detecting part comprising the electroconductive plates and coil core of an electrically conductive nature can be sealed from the exterior of the casing, thereby improving the reliability of the rotation sensor.

Further, the displacement detecting apparatus recited in claim 7 and the displacement detecting method recited in Claim 8 are the apparatus and method for detecting a displacement of a measurement target by adopting the rotation sensor recited in anyone of Claims 1 through 6, respectively.

Adopting such a displacement detecting apparatus enables to accurately detect a displacement of a measurement target without being affected by a mounted state of the apparatus itself.

The displacement detecting apparatus adopting the rotation sensor of the present invention is that for detecting a traveled distance of a measurement target, by the rotation sensor of anyone of claims 1 through 6.

The displacement detecting method adopting the rotation sensor of the present invention is that for detecting a traveled distance of a measurement target, by the rotation sensor of anyone of claims 1 through 6.

BRIEF DESCRIPTION OF THE DRAWINGS

The foregoing and other features of the present invention will become apparent to those skilled in the art to which the present invention relates from reading the following description with reference to the accompanying drawings, in which.

DETAILED DESCRIPTION OF THE PREFERRED EMBODIMENT

A rotation sensor according to a first embodiment of the present invention is explained as follows, with reference to the drawings.

Figure 3:
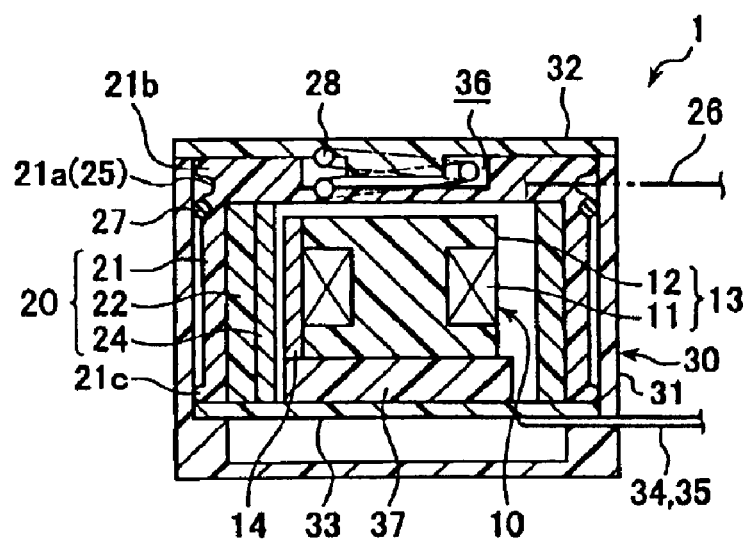
FIG. 3 is an axial cross-sectional view of a rotation sensor according to a first embodiment of the present invention.

As shown in FIG. 3, the rotation sensor 1 according to the first embodiment of the present invention comprises: a stator 10; a rotator 20 arranged around the stator 10 in a rotatable manner relative to the stator 10, to thereby detect a displacement of a measurement target correspondingly to an overlapped state with the stator 10; and a casing 30 for accommodating the rotator 20 therein. The rotation sensor 1 further includes such a constitution that a part of the outer periphery of the rotator is slidable relative to an inner surface of the casing.

Figure 4:
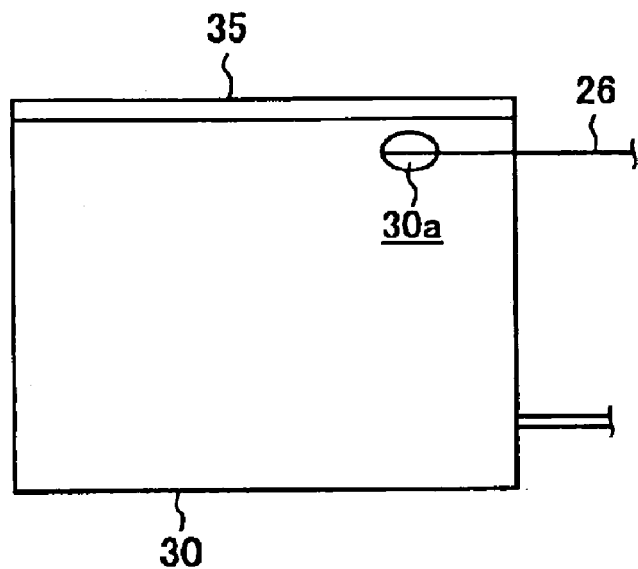
FIG. 4 is a side view of the rotation sensor of FIG. 3.

The casing 30 is made of a resin material such as PBT (polybutylene terephthalate), and comprises: a body 31 in a bottomed cylindrical shape having an opened upper portion; and a cover 32 which is attached onto the opened portion of the body 31 and which is made of an electrically conductive material such as metal like aluminum or electrically conductive plastics. As shown in FIG. 4, the body 31 is formed with a wire drawing-out hole 30a at a part of the peripheral surface of the body 31. As shown in FIG. 3, the casing 30 includes a lower stepped portion for carrying a printed board 33 thereon accommodated within the casing 30, and the printed board 33 supports the stator 10 and is installed with electronic parts (not shown). Drawn out from the interior of the casing toward the exterior thereof are: an electric power line 34 for supplying electric power to a coil 11; and a signal line 35 for detecting an inductance change of the coil 11.

Fixedly placed on the printed board 33 is a base 37 made of a plastic material such as PBT. Note, the base 37 serves as a spacer for adjusting a height of a coil core 13.

The rotator 20 comprises: a rotator body 21 made of PBT and in a cylindrical shape having an opened lower portion and a closed upper portion; a sub-core 22 tightly fitted on an inner periphery of the rotator body 21; and an electroconductive plate 24 in a curved plate shape affixed to an inner periphery of the sub-core 22 along substantially half the circumference of the sub-core 22. There is formed a groove portion 21a along the entire circumference at an upper side of the outer peripheral surface of the rotator body, and this groove portion 21a and its neighboring portion serve as a pulley 25 to be wound with a wire 26. Concretely, the groove portion 21a is wound with the wire 26 made of metal. The wire 26 has one end connected to the rotator 20, and the other end drawn out from the wire drawing-out hole 30a (FIG. 4) of the casing so as to be coupled to a measurement target the variation of which is to be detected, such as a vehicular seat shown in FIG. 7.

Note, the casing 30 includes its side wall portion extendedly formed to cover the outer periphery of the pulley. This allows to directly utilize the extended portion of the casing 30 as a protection wall for the pulley 25, thereby excluding the necessity to newly provide a member for protecting the pulley.

Interposed between the casing 30 and rotator 20 is an O-ring 27 for keeping liquid tightness therebetween, near the groove portion. This O-ring 27 allows to liquid-tightly seal an electroconductive plate 14 of the stator, the electroconductive plate 24 of the rotator, and the coil core 13, from the exterior of the casing.

The outer peripheral surface of the rotator includes both end portions 21b, 21c each formed to have a slightly larger diameter, so that the rotator 20 is allowed to contact with the inner periphery of the casing only at these portions 21a, 21b. Thus, the rotator 20 is slidable relative to the inner periphery of the casing upon rotation of the rotator 20, only at the both end portions of the outer peripheral surface of the rotator 20.

Meanwhile, the cylindrical sub-core 22 tightly fitted on the inner periphery of the rotator as well as a bobbin 12 to be described later are made of a magnetic resin material such as plastic magnet, in this embodiment. However, it is possible to use other materials such as a dielectric magnetic material comprising a synthetic thermoplastic resin (nylon, PP(polypropylene), PPS (polyphenylene sulfide), ABS resin) having a dielectric ability, and a soft magnetic material powder (such as ferrite including Ni—Zn, Mn—Zn) mixed with the resin.

The electroconductive plate 24, which is affixed to the inner periphery of the sub-core 22 along substantially half the circumference of the sub-core 22 and which is in a semicircle shape in an end view, is made of an electrically conductive material such as copper, aluminum or brass. This generates an eddy current, upon each passage of magnetic flux to be generated in the coil, which is described later.

Defined between the cover 32 and the rotator 20 is an annular space 36. Accommodated within the space 36 is an elastic member 28 for rotating and returning the rotator 20 to its initial state. Note, the elastic member 28 is assembled to exhibit no elastic forces in its initial state, such that one end and the other end of the elastic member 28 are fixed to the cover 32 and rotator 20, respectively.

In turn, the stator 10 is fixed onto the base 37 provided at the lower portion of the casing 30 via printed board 33 as described above. The stator 10 comprises the coil 11 for generating a magnetic flux, and the bobbin 12 made of a magnetic material such as plastic magnet having an "I" shaped cross section and wound with the coil 11. The electroconductive plate 14 in a semicircle shape in an end view is fixed to the outer peripheral surface of the cylindrical coil core 13 comprising the coil 11 and bobbin 12, along substantially half the circumference of the coil core. Also this electroconductive plate 14 is made of an electrically conductive material such as copper, aluminum, brass, or electrically conductive plastics.

Based on the above constitution, the displacement of the measurement target is transmitted to the pulley 25 of the rotator via wire 26 integrally coupled to the measurement target. The displacement transmitted to the pulley 25 is converted to a rotated-angle variation of the rotator 20. Then, the magnetic field generated by the coil core 13 is covered by the electroconductive plates 14, 24 of the rotator and stator, respectively, thereby causing eddy currents within the electroconductive plates 14, 24. Thus, by detecting the variation of the coil inductance caused by the eddy currents, it is possible to detect the traveled distance of the positionally displaced portion in a linear direction.

Figure 6:
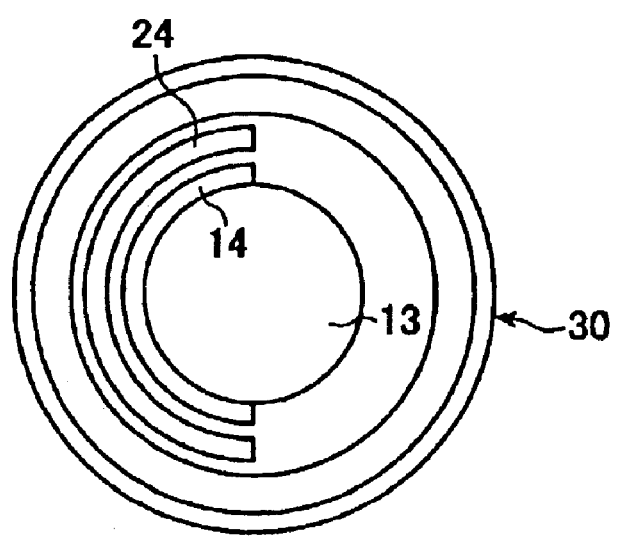
FIG. 6 is a plan view for explaining an operating state of the rotation sensor of FIG. 3 and a rotated-angle detection principle.

FIG. 6 is a view for explaining this detecting method. As the excited coil 11 is supplied with an alternating current, the magnetic flux flows through a magnetic circuit formed between the coil 11 and the sub-core 22. This induces eddy currents at surfaces of the electroconductive plates 14, 24, respectively. In this situation, there are formed a region having a larger magnetic resistance where the electroconductive plates 14, 24 are present, and a region having a smaller magnetic resistance where the electroconductive plates 14, 24 are absent. Relative rotation between the sub-core 22 and the coil core 13 varies the overlapped state between the larger and smaller magnetic resistance regions, thereby varying the total amount of magnetic flux which traverses a space between the sub-core 22 and the coil core 13. Correspondingly thereto, the magnetic flux self-induced within the coil 11 is varied, to thereby vary the inductance of the coil 11. Thus, by measuring the varied amount of this inductance, it is possible to accurately detect the relative rotated-angle variation between the sub-core 22 and the coil core 13.

Figure 1:
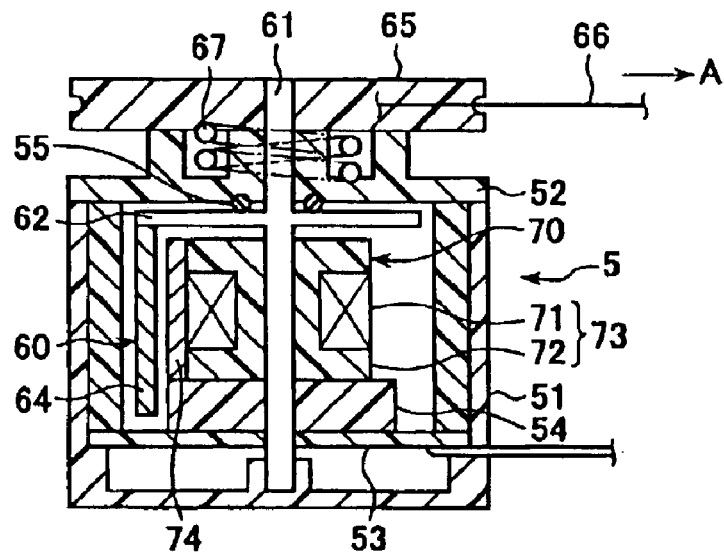
FIG. 1 is an axial cross-sectional view of a conventional rotation sensor.
Figure 2:
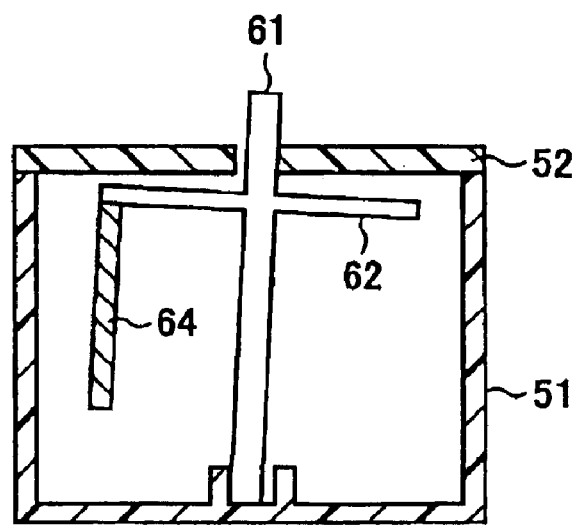
FIG. 2 is an axial cross-sectional view showing an inclined state of a shaft of the rotation sensor of FIG. 1 while omitting other elements.
Figure 5:
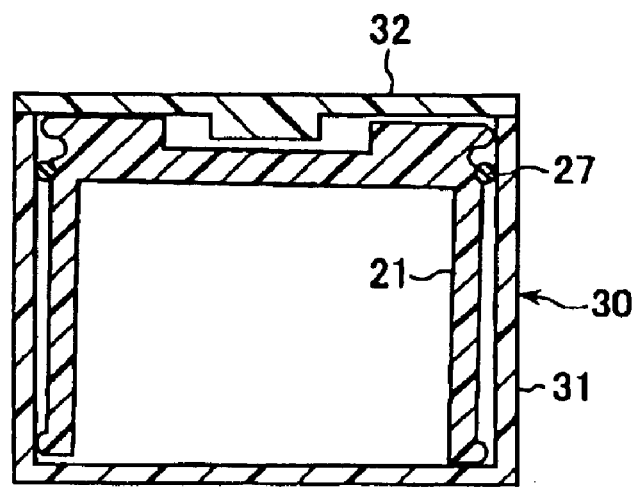
FIG. 5 is an axial cross-sectional view of a rotator body of the rotation sensor of FIG. 3 in a state accommodated within a casing of the rotation sensor while omitting other elements.

As explained above, both end portions 21b, 21c of the outer peripheral surface of the rotator are formed to have diameters slightly larger than the remaining portion of the outer peripheral surface of the rotator, and the rotator 20 is allowed to contact with the inner periphery of the casing at these portions 21a, 21b. Thus, the rotator 20 slides over the inner periphery of the casing only at these end portions 21b, 21c of the outer peripheral surface of the rotator upon rotation thereof. Unlike the conventional rotation sensor 5, the sliding portions between the casing 30 and rotator 20 are remarkably distant from the central axis of the rotator. Additionally, the clearance provided between the rotator 20 and casing 30 is substantially the same as the clearance provided between the shaft 61 and the bottom portion and cover 52 of the casing 51 in the conventional rotation sensor. Thus, even when the rotator 20 is inclined relative to the casing 30, such an inclination is limited to an extent shown in FIG. 5, which appears to be drastically smaller than the inclination of the shaft 61 of the conventional type of rotation sensor 5 shown in FIG. 2. This allows the rotator 20 to constantly smoothly rotate within the casing, thereby improving the reliability of the rotation sensor 1.

Moreover, since the pulley 25 is formed on the rotator 20 and accommodated within the casing, the pulley 25 is never interfered with members arranged near the rotation sensor 1 so that the rotation of the pulley is never obstructed.

Furthermore, the electroconductive plates 14, 24 and coil core 13 of an electrically conductive nature are sealed by the O-ring from the exterior of the casing, thereby improving the reliability of the rotation sensor 1 also from a standpoint of liquid tightness.

Figure 7:
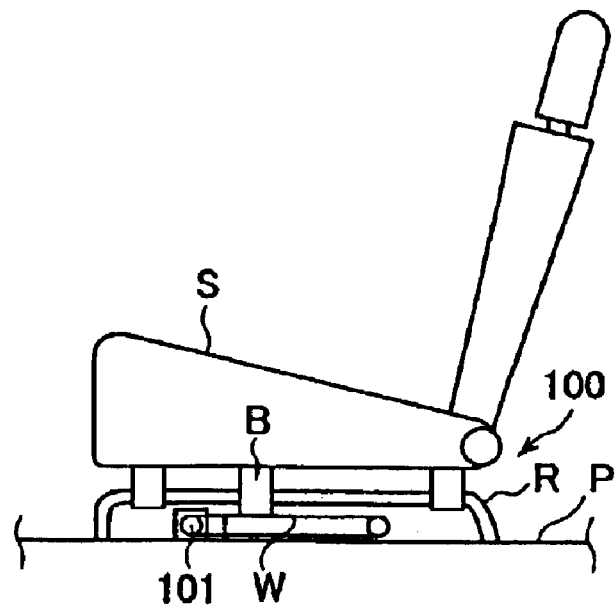
FIG. 7 is a schematic explanatory view in case of detecting a seat slid amount of a vehicle by adopting the rotation sensor of FIG. 3.

The thus constituted rotation sensor 1 is exemplarily mounted at a lower portion of the vehicular seat shown in FIG. 7, and is utilized to sense a slid amount of the seat relative to a seat rail.

Such a method and apparatus for sensing a slid amount of the seat are explained as follows.

FIG. 7 schematically shows a seat slid amount sensing apparatus 100 including the seat S slidably mounted on the seat rail R of a floor panel of a vehicular body. Mounted on the floor panel of the vehicular body is a rotation sensor 101 from which a wire W is drawn out so as to extend parallelly to the seat rail R. The lower portion of the seat and the wire are coupled to each other via rigid body B such as a metal bracket, so that the wire W is drawn out from the rotation sensor 101 correspondingly to the slid amount of the seat S.

The adopted rotation sensor 101 is the same as the rotation sensor 1 according to the aforementioned first embodiment of the present invention. This rotation sensor 101 restricts the inclination of the rotator itself to a smaller degree, in the aforementioned manner. This eliminates such a defect that the smooth rotation of the rotator is obstructed due to the inclination of the shaft, unlike the conventional type of rotation sensor 5. Thus, it becomes possible to accurately detect the slid amount of the seat S even when vibrations during running of the vehicle are transmitted to the rotation sensor 101.

Meanwhile, rotation sensors are required to be mounted within a limited space under the seat, thereby making it necessary to consider such a possibility of interference of a part of the rotation sensor 101 with a seat sliding/driving apparatus (not shown) and with a wire harness (not shown) connected to the apparatus.

In case of the conventional type of rotation sensor 5, such an interference has occasionally resulted in immobility of the pulley portion, thereby failing to achieve the inherent function of the rotation sensor. Nonetheless, the pulley is formed on the rotator and accommodated within the casing in case of the rotation sensor 101 according to this embodiment, thereby excluding such a possibility that the rotation sensor 101 is interfered with members therearound to thereby obstruct the rotation of the pulley.

Namely, in the aforementioned seat slid amount sensing apparatus 100, the rotator can be constantly smoothly rotated, thereby making it possible to constantly detect an accurate amount of the drawn out wire, i.e., the slid amount of the seat S, without any adverse effects such those due to vibrations of the vehicle and interference with members around the seat.

A rotation sensor 2 according to another embodiment of the present invention is explained as follows.

Corresponding reference numbers for the rotation sensor 1 according to the first embodiment are used to denote equivalent constituent elements, and the detailed description thereof shall be omitted.

Figure 8:
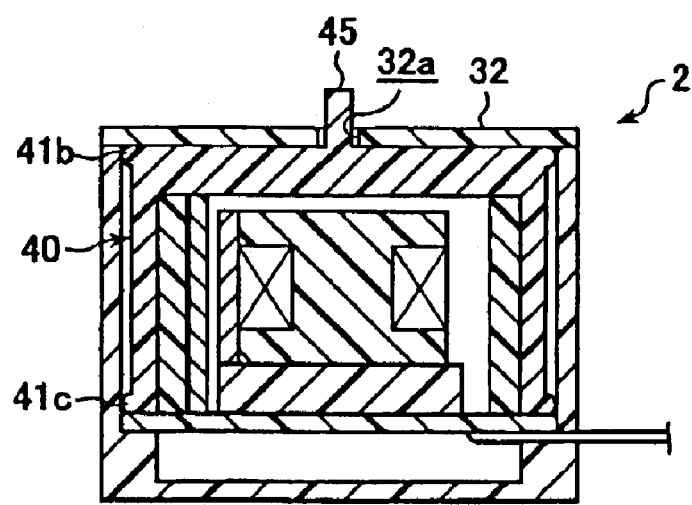
FIG. 8 is an axial cross-sectional view of a rotation sensor according to an embodiment different from the rotation sensor of FIG. 3.

Unlike the rotation sensor 1, the rotation sensor 2 according to this embodiment shown in FIG. 8 includes a rotator 40 with no pulley portions, and instead includes a rotary shaft 45 protruded toward the exterior of the casing from a center portion of the rotator through a shaft drawing-out hole 32a of a cover 32. Further, the rotator 40 is to be rotated correspondingly to the rotated-angle variation of the rotary shaft 45, and the rotated-angle variation of the rotary shaft 45 is detected based on the same detecting principle as the aforementioned rotated angle detecting principle. Thus, coupling the rotary shaft 45 to a detection target (not shown) enables to accurately detect the rotated angle of the detection target.

Namely, the rotation sensor 2 according to this embodiment of the present invention is common to the rotation sensor 1 according to the above embodiment, in that the rotator includes a part (both end portions) 41b, 41c of the outer periphery formed to have a slightly larger diameter along the entire circumference of the rotator. Only these end portions 41b, 41c are slidable over the inner periphery of the casing. This reduces the possible inclination of the rotator 40 itself, so that the smooth rotation of the rotator is never obstructed due to the inclination of the shaft, unlike the conventional type of rotation sensor 5. This enables to accurately detect the rotated-angle variation of the detection target, thereby making it possible to obtain a stabilized detection signal.

Although the rotator has been slid over the inner periphery of the casing at the part of the peripheral surface of the rotator in each of the above embodiments, the present invention is not limited thereto and the whole of the peripheral surface of the rotator may be constituted to be slidable over the inner surface of the casing.

In the above embodiments, situations where the above rotation sensors are adopted to detect a slid amount in a vehicular seat apparatus have been explained. However, applications of the rotation sensors are not limited thereto, and the rotation sensors may be exemplarily utilized to detect an operated amount of a power window regulator or to detect an elevated amount of a tilt steering.

What is claimed:

1. A rotation sensor for detecting a rotated-angle variation of a measurement target, comprising:
    a stator;
    a rotator arranged around said stator in a rotatable manner relative to said stator, so as to detect a rotated-angle variation of a detection target correspondingly to an overlapped state of said rotator with said stator; and
    a casing for accommodating said rotator therein;
    wherein at least a part of an outer peripheral surface of said rotator is slidable relative to an inner surface of said casing.

2. The rotation sensor of claim 1,
    wherein said rotator is protrudedly formed with a shaft for rotating said rotator.

3. The rotation sensor of claim 1,
    wherein said rotator is formed with a pulley at a predetermined position of said rotator, and
    wherein said rotator is rotatable by a wire which is wound around said pulley and which is drawn out to the exterior of said casing.

4. The rotation sensor of claim 1,
    wherein said rotator is provided with an electroconductive plate of an electrically conductive nature;
    wherein said stator is provided with an electroconductive plate and a coil core of an electrically conductive nature; and
    wherein there is a seal member interposed between said casing and said rotator, so as to liquid-tightly seal said electroconductive plate of said stator, said electroconductive plate and said coil core of said rotator, from the exterior of said casing.

5. The rotation sensor of claim 2,
    wherein said rotator is provided with an electroconductive plate of an electrically conductive nature;
    wherein said stator is provided with an electroconductive plate and a coil core of an electrically conductive nature; and wherein there is a seal member interposed between said casing and said rotator, so as to liquid-tightly seal said electroconductive plate of said stator, said electroconductive plate and said coil core of said rotator from the exterior of said casing.

6. The rotation sensor of claim 3, wherein said rotator is provided with an electroconductive plate of an electrically conductive nature;

wherein said stator is provided with an electroconductive plate and a coil core of an electrically conductive nature; and wherein there is a seal member interposed between said casing and said rotator, so as to liquid-tightly seal said electroconductive plate of said stator, said electroconductive plate and said coil core of said rotator from the exterior of said casing.

7. A displacement detecting apparatus for detecting a traveled distance of a measurement target, by said rotation sensor of claim 1.

8. A displacement detecting method for detecting a traveled distance of a measurement target, by said rotation sensor of claim 1, comprising:

transmitting displacement of a measuring object to a rotator via a wire connected with the measuring object incorporative; and detecting the displacement of the measuring object by detecting rotation of said rotator.

9. The rotation sensor of claim 7, wherein said rotator is protrudedly formed with a shaft for rotating said rotator.

10. The rotation sensor of claim 7, wherein said rotator is formed with a pulley at a predetermined position of said rotator, and wherein said rotator is rotatable by a wire which is wound around said pulley and which is drawn out to the exterior of said casing.

11. The rotation sensor of claim 7, wherein said rotator is provided with an electroconductive plate of an electrically conductive nature;

wherein said stator is provided with an electroconductive plate and a coil core of an electrically conductive nature; and wherein there is a seal member interposed between said casing and said rotator, so as to liquid-tightly seal said electroconductive plate of said stator, said electroconductive plate and said coil core of said rotator, from the exterior of said casing.

12. The rotation sensor of claim 9, wherein said rotator is provided with an electroconductive plate of an electrically conductive nature;

wherein said stator is provided with an electroconductive plate and a coil core of an electrically conductive nature; and wherein there is a seal member interposed between said casing and said rotator, so as to liquid-tightly seal said electroconductive plate of said stator, said electroconductive plate and said coil core of said rotator from the exterior of said casing.

13. The rotation sensor of claim 10, wherein said rotator is provided with an electroconductive plate of an electrically conductive nature;

wherein said stator is provided with an electroconductive plate and a coil core of an electrically conductive nature; and wherein there is a seal member interposed between said casing and said rotator, so as to liquid-tightly seal said electroconductive plate of said stator, said electroconductive plate and said coil core of said rotator from the exterior of said casing.

14. The displacement detecting method of claim 8, wherein said rotator is protrudedly formed with a shaft for rotating said rotator.

15. The displacement detecting method of claim 8, wherein said rotator is formed with a pulley at a predetermined position of said rotator, and wherein said rotator is rotatable by a wire which is wound around said pulley and which is drawn out to the exterior of said casing.

16. The displacement detecting method of claim 8, wherein said rotator is provided with an electroconductive plate of an electrically conductive nature;

wherein said stator is provided with an electroconductive plate and a coil core of an electrically conductive nature; and wherein there is a seal member interposed between said casing and said rotator, so as to liquid-tightly seal said electroconductive plate of said stator, said electroconductive plate and said coil core of said rotator, from the exterior of said casing.

17. The displacement detecting method of claim 14, wherein said rotator is provided with an electroconductive plate of an electrically conductive nature;

wherein said stator is provided with an electroconductive plate and a coil core of an electrically conductive nature; and wherein there is a seal member interposed between said casing and said rotator, so as to liquid-tightly seal said electroconductive plate of said stator, said electroconductive plate and said coil core of said rotator from the exterior of said casing.

18. The displacement detecting method of claim 15, wherein said rotator is provided with an electroconductive plate of an electrically conductive nature;

wherein said stator is provided with an electroconductive plate and a coil core of an electrically conductive nature; and wherein there is a seal member interposed between said casing and said rotator, so as to liquid-tightly seal said electroconductive plate of said stator, said electroconductive plate and said coil core of said rotator from the exterior of said casing.

* * * * *